March 15, 1927. 1,621,137
M. I. SEILER
REAMING JIG
Filed Sept. 17, 1921   3 Sheets-Sheet 1
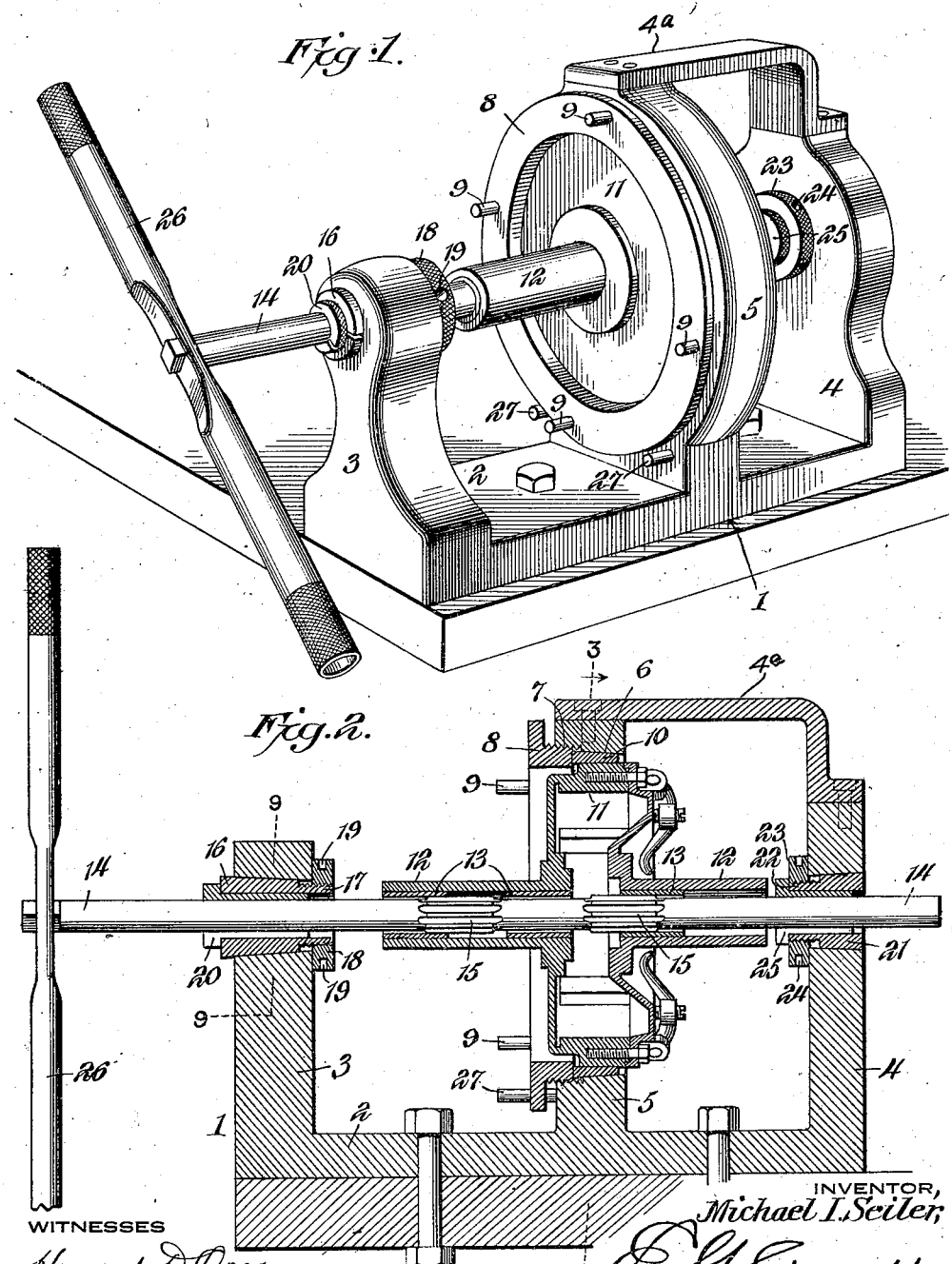

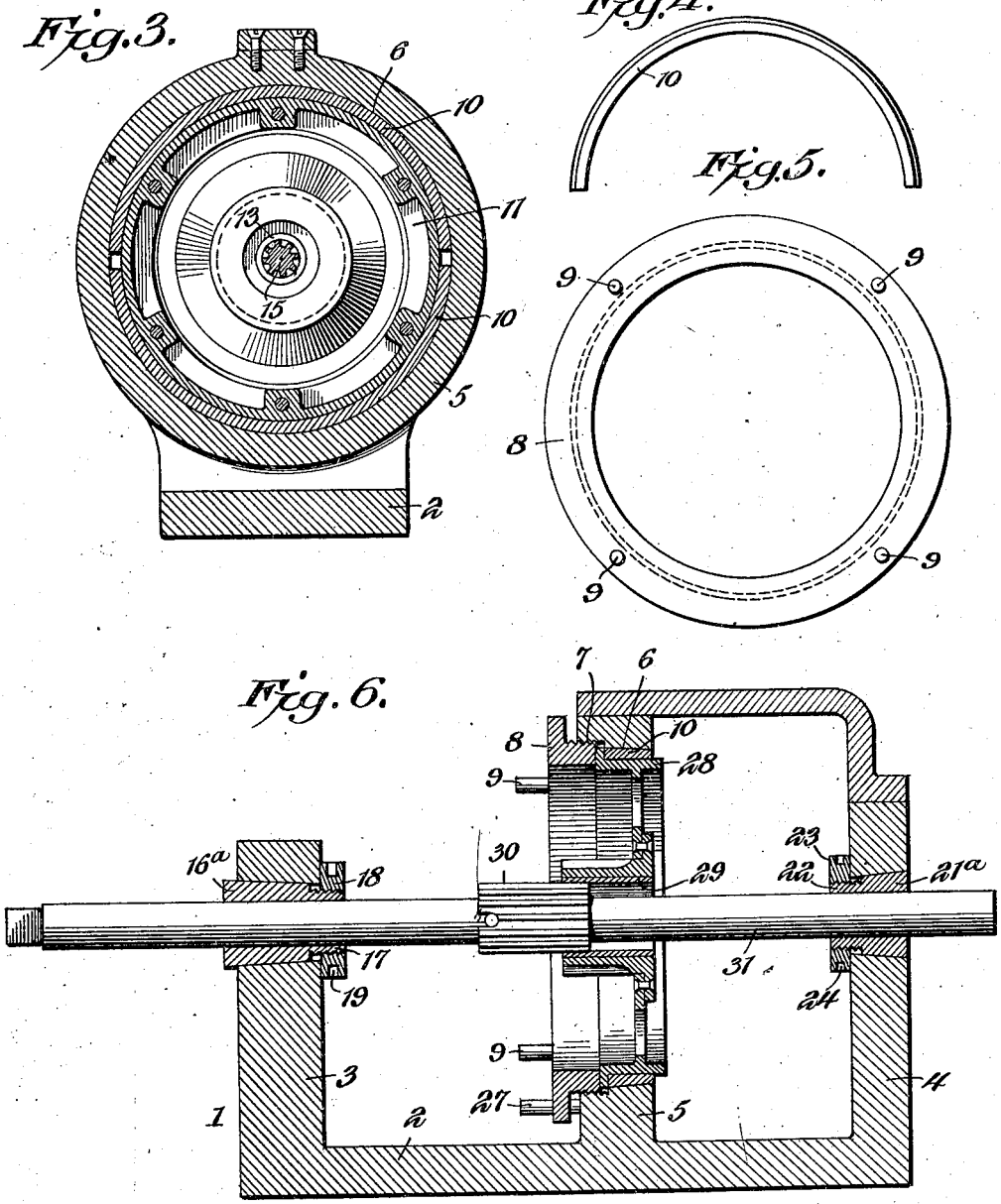

March 15, 1927.
M. I. SEILER
REAMING JIG
1,621,137
Filed Sept. 17, 1921   3 Sheets-Sheet 3
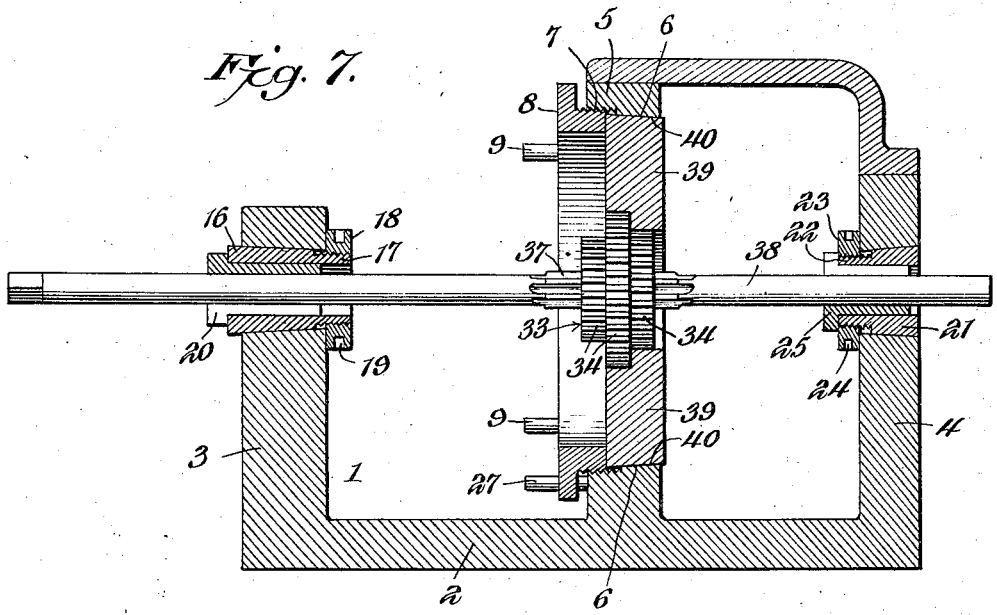
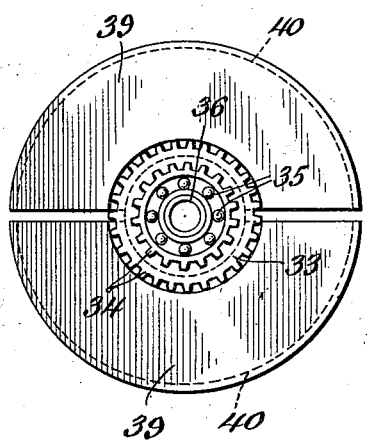
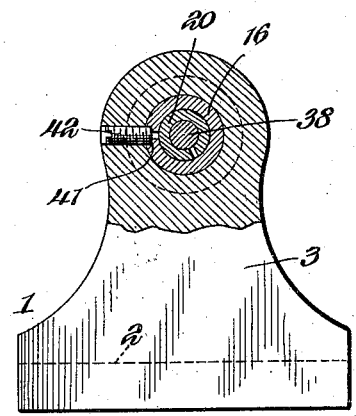
Michael I. Seiler, INVENTOR
WITNESSES
BY
ATTORNEY Patented Mar. 15, 1927.

1,621,137

UNITED STATES PATENT OFFICE.

MICHAEL I. SEILER, OF MILLERSBURG, PENNSYLVANIA, ASSIGNOR TO KEYSTONE REAMER & TOOL CO., OF MILLERSBURG, PENNSYLVANIA, A CORPORATION OF PENNSYLVANIA.

REAMING JIG.

Application filed September 17, 1921. Serial No. 501,306.

This invention has reference to reamers for automobile transmission parts, and its object is to provide means whereby transmission drums and other articles of like nature having bushings or holes, may be reamed straight and true with absolute accuracy and with great ease, the reaming jig being characterized by simplicity and rigidity of construction.

The reaming jig, while not confined to any particular make of automobile, is designed more particularly for use in connection with the Ford automobile. After being run for a period of time, certain parts, especially those of the transmission assembly of the automobile, become worn and loose and consequently produce noises, which are annoying in themselves, and are productive of wear in other parts, and ordinarily must be replaced by new parts and refitted to those parts which are not replaced, such operations resulting in expense due to the replacements and refittings.

By the use of the instrumentalities forming the subject matter of this invention, the several elements of the transmission may be removed from the transmission assembly, and be separately mounted in the transmission reamer jig with the assurance that bushings or other parts will be accurately centered, and reamed straight and true, both with respect to themselves and to other parts of the assembly, with the absolute assurance that finished work will be accurately performed without the necessity of employing highly skilled labor.

The invention will be best understood from a consideration of the following detailed description taken in connection with the accompanying drawings forming a part of this specification, with the understanding, however, that the invention is not confined to any strict conformity with the showing of the drawings but may be changed and modified so long as such changes and modifications mark no material departure from the salient features of the invention as expressed in the appended claims.

In the drawings:

Fig. 1 is a perspective view of the jig frame with the clutch casing of an automobile transmission mounted therein, in position for reaming the bushings carried by said clutch casing.

Fig. 2 is a longitudinal diametric section thereof.

Fig. 3 is a section on the line 3—3 of Fig. 2.

Fig. 4 is a perspective view of a split or two-part taper ring for holding and centering parts lodged in the reamer frame.

Fig. 5 is a face view of a screw ring for forcing parts into the taper clamp ring.

Fig. 6 is a longitudinal vertical section through the reamer jig with parts for adapting it for holding other elements of the automobile transmission from those shown in connection with Fig. 1.

Fig. 7 is a view similar to Fig. 2 but showing other parts of the transmission mounted therein.

Fig. 8 is a face view of the structure shown in Fig. 7 but removed from the reamer frame.

Fig. 9 is a section on the line 9—9 of Fig. 2.

Referring to the drawings, as shown in Fig. 1 and associated figures, a frame 1 of a reamer jig, comprising an elongated base 2 with a post 3 erected on one end and another post 4 erected on the other end, while between the two posts there is located an upstanding ring 5 which, together with the posts 3 and 4, is or may be cast in one piece with the base 2.

Since the post 4 and ring 5 are, in some of the operations of the reamer, subjected to considerable strain tending to separate them, there is provided a brace arm 4ª made fast at one end to the top of the post 4 and at the other end to the top of the ring 5 whereby the post 4 and ring 5 are held rigidly together. For convenience in manufacture, the brace 4ª is made separate from the post 4 and ring 5.

The ring 5 is provided with an inner face 6 tapering from that side of the ring toward the post 3 to the side of the ring toward the post 4 and the ring 5 has an entering screw-threaded portion 7 concentric with the axis of the ring and extending into the taper portion 6. Adapted to the screw-threaded portion 7 is an exteriorly threaded clamp ring 8 provided on one face with a circular series of pins 9 by means of which the ring may be screwed, by hand if desired, into the threaded part 7. The threaded portion of the clamp ring 8 is long enough to engage a beveled split, wedge-like centering ring 10 conforming to the taper surface 6 on the inner face of the ring 5. The split or two-part wedge ring 10 is adapted to embrace a clutch housing 11 forming part of the automobile transmission assembly and therefore requiring no special description, except that the clutch housing is, as is customary, provided with a hollow tube 12 enclosing bushings 13 upon which the hubs are mounted. In the operation of the automobile, the bushings 13 sustain the wear of the clutch housing and when looseness occurs it is due to the wear of such bushings, whether such wear be concentric to the axis of rotation or becomes eccentric thereto, resulting in looseness and chattering of the parts, with the attendant noise. Ordinarily the wear is taken up by driving out the worn bushings and substituting new ones. With the invention, the renewal of the parts and attendant expense is avoided by removing the clutch housing with those parts which belong to it and slightly enlarging the bushings by reaming them. To accomplish this there is provided a rod or shaft 14 on which are formed aligned reamers 15 of appropriate size and suitably spaced apart so that they may pass through and enlarge to the desired size bushings 13.

Mounted in the post 3 is a taper split bushing 16 terminating at the end toward the ring 5 in a threaded extension 17 receiving a screw collar 18 with spanner sockets 19 therein, whereby the collar 18 may engage and draw the bushing 16 firmly into place, the collar 18 bearing against the inner face of the post 3. Fitted in and extending in part or wholly through the bushing 16 is a split collet 20 which by the drawing effect of the collar 18 on the bushing 16 becomes firmly seated and centered in the bushing and binds upon the corresponding end portion of the rod or shaft 14 to center it in the longitudinal axis of rotation of said rod or shaft 14 without lost motion.

Similarly located in the post 4 is a taper split bushing 21 extending through the post 4 and at the end toward the ring 5 being exteriorly screw-threaded, as shown at 22, to receive a screw collar 23 having spanner sockets 24 whereby the collar 23 may be turned by means of a spanner wrench. The shaft or rod 14 within the bushing 21 is surrounded by a split collet 25 contracted upon the shaft 14 by longitudinal movement of the bushing 21 to the left as viewed in Fig. 2.

When it is desired to ream out the bushings 13 of the clutch housing of the transmission, such housing is placed in the ring 5, the split wedge ring 10 is placed about the housing and the ring 8 is screwed into the supporting ring 5. Now, the shaft 14 may be introduced into place until it reaches the collet 25 and the collet 20 may ultimately be turned, whereupon all the parts are tightened up to bring them into accurate alignment to insure centering and absolute accuracy of work. By applying a handle 26 to the shaft 14, the latter may be turned and by applying endwise pressure to the handle 26, especially on small work, the reamers 15 are caused to traverse the bushings 13 and enlarge them interiorly to size, producing straight, true, centered and aligned passages in the several bushings 13, correcting any worn bearings in the bushings and restoring the working parts, so far as the clutch housing is concerned, to the original condition. This operation is easily accomplished. The reamer is of extreme simplicity and particularly rigid in its construction and the work accomplished is accurate within the limits of fine machine work.

As a convenience, pins 27 are provided on the ring 5 below the seating position of the ring 8 to support the latter while being entered into said screw-threaded portion 7 of the ring 5.

The transmission assembly of the Ford automobile includes slow speed and reverse drums having axially located bushings subject to wear, which bushings require reaming from time to time. In Fig. 6 there is shown such a drum 28 provided with a bushing 29. This bushing is larger than the bushings 13 and hence requires the use of a reamer 30 considerably larger than the reamers 15, such reamer also mounted on a larger shaft 31. The drum 28 with its hub portion containing the bushing 29 is much shorter axially than the clutch housing 11, and the reamer 30 is therefore much shorter than the combined reamers 15.

The reamer frame 1 is or may be, in the showing of Fig. 6, the same as in the showing of Fig. 1 and associated figures, but because of the larger size of the reamer 30 and shaft 31, the posts 3 and 4 have bushings 16ª and 21ª through which the shaft 31 passes and in which the shaft bears directly, without the interposition of the collets 20 and 25, although this does not preclude the use of similar collets. The bushings 16ª and 21ª are held in place by clamp collars 18 and 23, respectively, like the structure shown in Figs. 1 and 2. All those parts shown in Fig. 6, which are also shown in Figs. 1 and 2, are designated by the same reference numerals and hence the description thereof is not repeated.

In Figs. 7 and 8 the reamer frame 1 and parts in common with the showing of Figs. 1 and 2, are designated by the same reference numerals, but the reamer structure is arranged for reaming out the bushings of the planetary gears employed in the transmission assembly of the Ford automobile. Such gears, of which one set, indicated at 33, is shown in each of Figs. 7 and 8, each comprises three gear wheels 34 secured together in face to face engagement by rivets 35 and provided with a common bushing 36 shown in Fig. 8. Each group 33 of three axially joined gear wheels 34 is of such short axial length than the bushing 36 may be bored by a single reamer 37 formed on a reamer shaft 38 mounted in the posts 3 and 4 in the collets 20 and 25, respectively, in turn mounted in bushings 16 and 21 clamped in place by collars 18 and 23, all similar to the showing of Figs. 1 and 2.

The planetary gears are held in a split taper block 39 having a taper periphery 40 to fit the inner taper wall 6 of the ring 5, as in the arrangement shown in Figs. 1 and 2.

In Fig. 9 the bushing 16 is shown as provided with a seat 41 to receive a set screw 42 entering the seat to hold the bushing against turning with the collar 18 and this same arrangement may be employed in conjunction with the structure shown in the other figures of the drawings where applicable.

What is claimed is:—

1. In a reaming jig, the combination of a rigid ring-shaped work holder surrounding the part to be reamed and having an interior taper surface with the larger end threaded, a two-part wedge ring for interposition between the taper surface of the work holder and the work in advance of the threaded end, and a threaded clamping ring adapted to be screwed into the work holder and engaging with the two-part wedge ring to move the same and clamp the work axially and by radial compression.

2. In a reaming jig for automobile transmission parts, an intermediate ring-shaped holder for the part to be reamed, clamping means carried by the work holder in surrounding relation to the work and co-acting with the work holder to hold the work by compression, guides on opposite sides of the work holder, and journal supports for a reamer tool mounted in the guides and provided with means for aligning the guides and the work with respect to the reamer tool.

3. A reaming jig for reaming the wear parts of automobile transmissions, comprising a basic member, an intermediate ring-shaped work holder erected thereon, posts rising from the basic member on opposite sides of the ring-shaped work holder, with the basic member, posts and ring-shaped member all cast in one piece, and guides for a reamer mounted in the posts and provided with adjusting means, for aligning said guides, concentric with the axis of the work holder.

4. A reaming jig for reaming the wear parts of automobile transmissions, comprising a basic member, an intermediate ring-shaped work holder erected thereon, posts rising from the basic member on opposite sides of the ring-shaped work holder, with the basic member, posts and ring-shaped member all cast in one piece, and guides for a reamer mounted in the posts and provided with adjusting means, for aligning said guides, concentric with the axis of the work holder, the ring-shaped work holder and that post on the side of the ring-shaped work holder remote from the entering end of the reamer structure having a brace connecting them and resistant to forces tending to separate the post and ring-shaped work holder.

In testimony, that I claim the foregoing as my own, I have hereto affixed by signature.

MICHAEL I. SEILER.